United States Patent
Agnihotri et al.

(10) Patent No.: US 8,352,500 B2
(45) Date of Patent: Jan. 8, 2013

(54) CENTRALIZED MULTIMEDIA ACCESS

(75) Inventors: Tanmay Agnihotri, San Diego, CA (US); Sivaraman Varatharajan, San Diego, CA (US)

(73) Assignee: Sony Corporation, Tokyo (JP)

( * ) Notice: Subject to any disclaimer, the term of this patent is extended or adjusted under 35 U.S.C. 154(b) by 124 days.

(21) Appl. No.: 12/896,712

(22) Filed: Oct. 1, 2010

(65) Prior Publication Data

US 2012/0084326 A1    Apr. 5, 2012

(51) Int. Cl.
*G06F 17/00* (2006.01)

(52) U.S. Cl. ......... 707/791; 707/802; 707/822; 707/828

(58) Field of Classification Search ........... 707/600–899
See application file for complete search history.

(56) References Cited

U.S. PATENT DOCUMENTS

| | | |
|---|---|---|
| 7,228,305 B1 | 6/2007 | Eyal et al. |
| 7,346,687 B2 | 3/2008 | Lipscomb et al. |
| 2006/0218187 A1* | 9/2006 | Plastina et al. ............. 707/104.1 |
| 2007/0233743 A1* | 10/2007 | Rosenberg ................. 707/104.1 |
| 2008/0005179 A1 | 1/2008 | Friedman et al. |
| 2010/0023578 A1 | 1/2010 | Brant et al. |
| 2010/0162115 A1 | 6/2010 | Ringewald et al. |

* cited by examiner

*Primary Examiner* — Isaac M Woo

(74) *Attorney, Agent, or Firm* — Blakely, Sokoloff, Taylor & Zafman LLP

(57) ABSTRACT

An embodiment is a technique to perform centralized multimedia access. A playlist is created in a single document, the playlist including a plurality of items. Each of the items specifies an access parameter to a multimedia file and a play parameter. The playlist is stored in a central location. The multimedia file as pointed to by the playlist is retrieved or accessed in the central location using the access parameter to play the multimedia file according to the play parameter. A storage element contains a pointer to point to a playlist in a single document. The playlist includes a plurality of items. Each of the items specifies an access parameter to a multimedia file and a play parameter. A compiler compiles the playlist to determine the access parameter, the play parameter, and a plug-in associated with the multimedia file. The plug-in plays the multimedia file according to the play parameter.

22 Claims, 4 Drawing Sheets

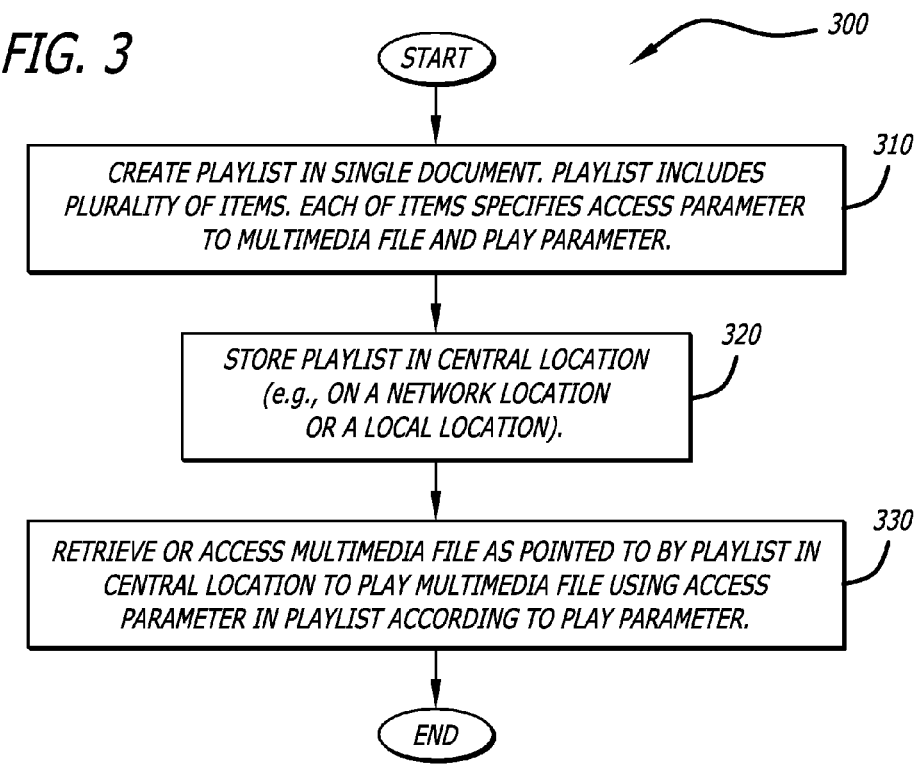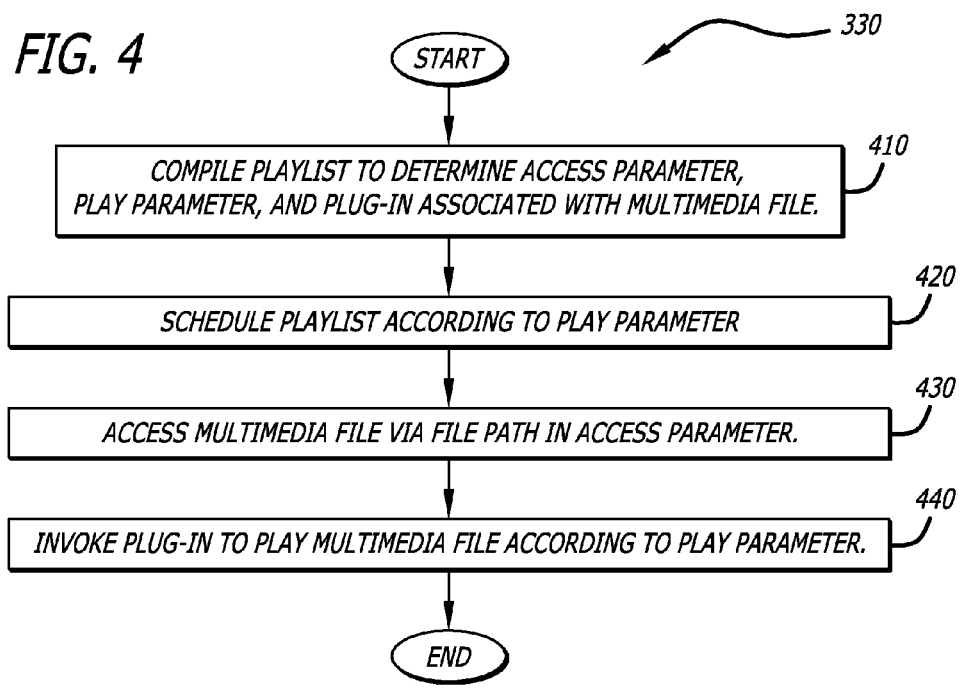

CENTRALIZED MULTIMEDIA ACCESS

TECHNICAL FIELD

The presently disclosed embodiments are directed to the field of multimedia, and more specifically, to multimedia access.

BACKGROUND

Advances in multimedia and communication technologies have provided convenience to users in accessing multimedia files. Users can download or play multimedia files at their convenience using a Web browser or a mobile device.

However, when media files are located at different locations, it becomes cumbersome for the user to switch between formats and locations to play the media contents.

SUMMARY

One disclosed feature of the embodiments is a method and apparatus to perform centralized multimedia access. A playlist is created in a single document, the playlist including a plurality of items. Each of the items specifies an access parameter to a multimedia file and a play parameter. The playlist is stored in a central location. The multimedia file as pointed to by the playlist is retrieved or accessed in the central location using the access parameter in the playlist to play the multimedia file according to the play parameter.

Another disclosed feature of the embodiments is a method and apparatus to access centralized multimedia files. A storage element contains a pointer to point to a playlist in a single document. The playlist includes a plurality of items. Each of the items specifies an access parameter to a multimedia file and a play parameter. A compiler compiles the playlist to determine the access parameter, the play parameter, and a plug-in associated with the multimedia file. The plug-in plays the multimedia file according to the play parameter.

BRIEF DESCRIPTION OF THE DRAWINGS

Embodiments may best be understood by referring to the following description and accompanying drawings that are used to illustrate embodiments. In the drawings.

FIG. 3 is a flowchart illustrating a process for centralized multimedia access according to one embodiment.

FIG. 4 is a flowchart illustrating a process to access the playlist of multimedia files according to one embodiment.

DETAILED DESCRIPTION

Figure 1:
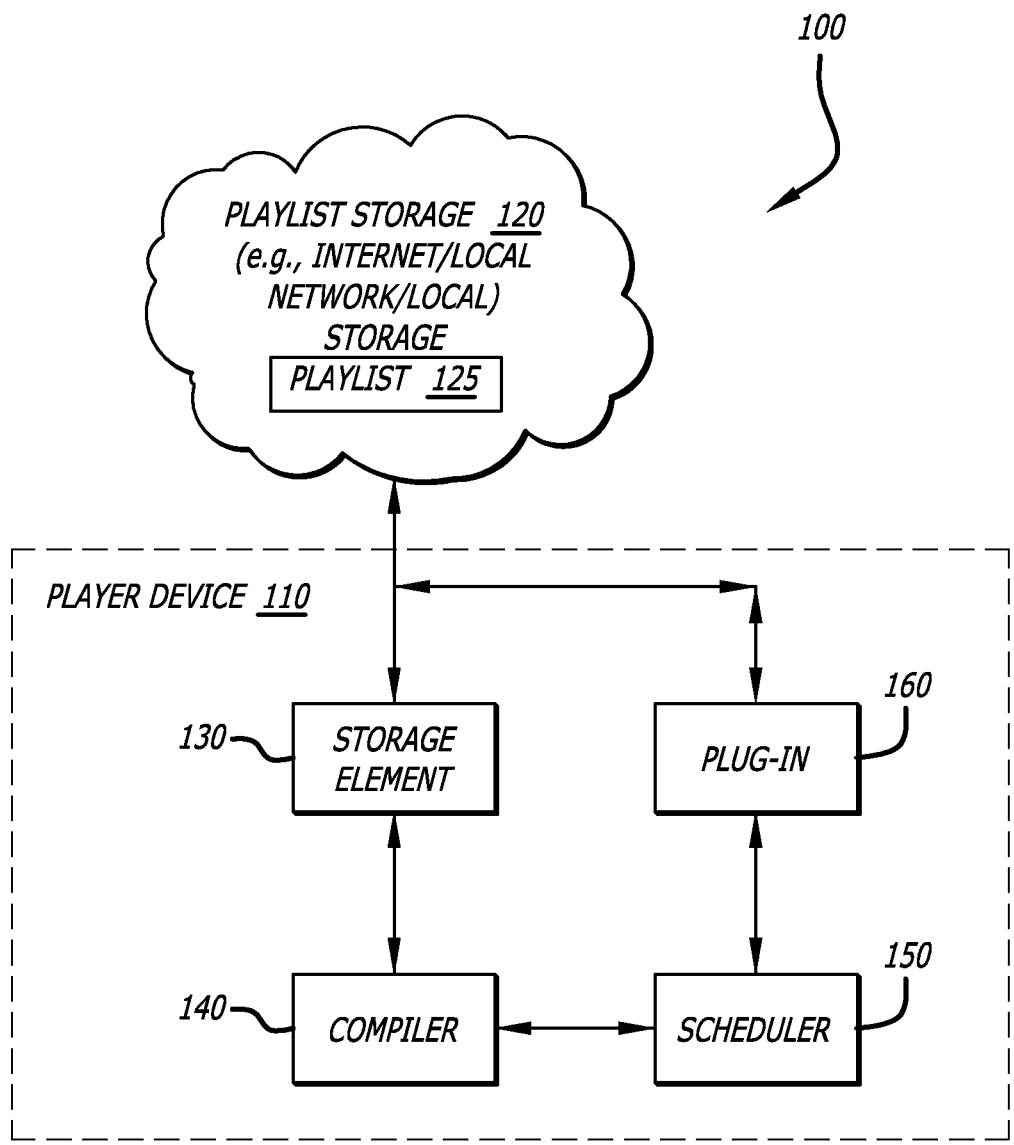
FIG. 1 is a diagram illustrating a system for centralized multimedia access according to one embodiment.

One disclosed feature of the embodiments is a technique to perform centralized multimedia access. A playlist is created in a single document, the playlist including a plurality of items. Each of the items specifies an access parameter to a multimedia file and a play parameter. The playlist is stored in a central location. The playlist is accessed in the central location so that the multimedia file is retrieved or accessed using the access parameter in the playlist to play the multimedia file according to the play parameter.

Another disclosed feature of the embodiments is a method and apparatus to access centralized multimedia files. A storage element contains a pointer to point to a playlist in a single document. The playlist includes a plurality of items. Each of the items specifies an access parameter to a multimedia file and a play parameter. A compiler compiles the playlist to determine the access parameter, the play parameter, and a plug-in associated with the multimedia file. The plug-in plays the multimedia file according to the play parameter.

In the following description, numerous specific details are set forth. However, it is understood that embodiments may be practiced without these specific details. In other instances, well-known circuits, structures, and techniques have not been shown to avoid obscuring the understanding of this description.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. The beginning of a flowchart may be indicated by a START label. The end of a flowchart may be indicated by an END label. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

One feature of the embodiments is a technique to provide centralized accesses for multimedia files. A playlist may be created to contain a list of all the locations or addresses that contain or point to the multimedia files to be played. The playlist may be stored on a network location (e.g., the Internet) or a local location (e.g., memory device on local platform). By centralizing all the locations or addresses that contain or point to the multimedia files in a single document, the user does not have to switch between different file formats and/or different access locations. In addition, the user may specify how the multimedia files are played such as how often or at a particular time and date. Once the playlist is created, the user does not have to manually access the multimedia files. The system will automatically access the multimedia files and play them according to the schedule provided in the playlist. This provides convenience to the user.

FIG. 1 is a diagram illustrating a system 100 for centralized multimedia access according to one embodiment. The system 100 includes a player device 110 and a playlist storage 120. The system 100 may include more or less than the above.

The player device 110 is any device that may play a multimedia file. It may be a television set, an audio player, a mobile device (e.g., mobile phone), a desktop computer, or any device that may play a video clip, an audio clip, or render an image or graphic file. The player device 110 typically includes devices or applications that may be used to play the multimedia file such as a screen display, a video player, an audio device that may be interfaced to a speaker or an audio output, a graphics controller, an audio codec, etc. The player device 110 may include a storage element 130, a compiler 140, a scheduler 150, and a plug-in 160. It may include more or less than the above elements.

The storage element 130 may be any suitable storage element such as a memory location, a memory device, a volatile or non-volatile storage device. It may contain a pointer to point to a playlist in a single document. Alternatively, it may contain the playlist when the playlist is stored in a local location. The playlist may include a plurality of items. Each of the items may specify an access parameter to a multimedia file and a play parameter.

The compiler or interpreter 140 compiles or interprets the playlist to determine the access parameter, the play parameter, and a plug-in associated with the multimedia file. The compiler 140 may parse the playlist to extract the corresponding play parameter such as the frequency and the time and transfer to the scheduler 150. The scheduler 150 schedules the items on the play list to be played by the plug-in at the specified time and date.

The plug-in 160 plays the multimedia file according to the play parameter or as scheduled by the scheduler 150. The plug-in 160 may be a software module or a hardware or firmware module that may be designed to play the multimedia file at the specified file format. It may include a set of software components to add or enhance the capabilities of the application that is used to play the multimedia files. It may include a file converter that is used to convert the format of the multimedia file.

The playlist storage 120 may be a remote storage or a local storage. When it is a remote storage, it may be located on a network such as the Internet or a local area network (LAN). When it is a local storage, it may be stored on the local device such as a device located on the same platform with the player device 110, or the storage element 130. The playlist storage 120 may store a playlist 125. Access to the playlist 125 may be through a secure channel or under a secure protocol. For example, a password or an authentication procedure may be required for accessing the playlist 125. The playlist 125 may also be downloaded to the local device for direct access. The playlist 125 may include the plurality of items corresponds to a plurality of multimedia files having a mix of different types and formats. The multimedia files may include video files, audio files, image or graphics files at different formats.

The video file format may be any available video file formats. Examples of these video file formats include Moving Picture Experts Group (MPEG) (e.g., MPEG-4), Audio Video Interleave (AVI), Apple QuickTime (MOV), Windows Media Video (WMV), DiVX, Advanced Video Coding High Definition (AVCHP), Flash (e.g., Video, Movie, MP4), Real Media (RM), DVD Video Object, Camcorder Recorded Video, etc.

The audio file format may be any one of an uncompressed audio format, a lossless audio format, or a lossy audio format. Examples of these audio file formats may include MP3, MP4, Windows Media Audio (WMA), WAV, Real Audio (RA), Digital Speech Standard (DSS), Memory Stick Compressed Voice (MSV), GSM, VOX, AAC, etc.

The image file format may be any of the available image file formats including raster, vector, and 3-D formats. Examples of these image file formats include Joint Photographic Experts Group (JPEG), Tagged Image File Format (TIFF), Graphics Interchange Form a (GIF), Portable Network Graphics (PNG), Bitmap (BMP), Computer Graphics Metafile (CGM), Scalable Vector Graphics (SVG), JPEG stereo, Multi-Picture Object (MPO), etc.

Figure 2:
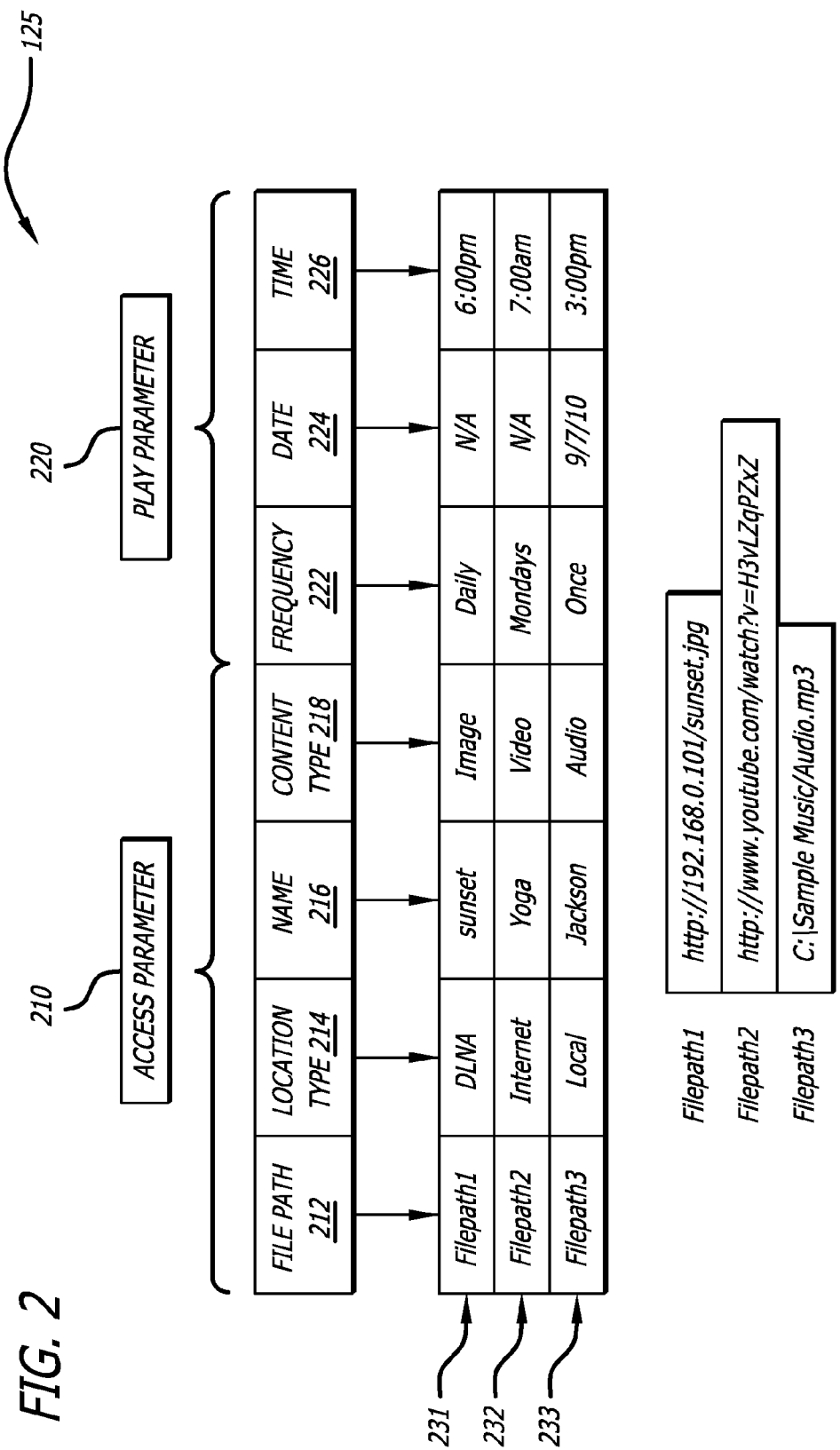
FIG. 2 is a diagram illustrating a playlist according to one embodiment.

FIG. 2 is a diagram illustrating a playlist 125 according to one embodiment. The playlist 125 may be a list of items corresponding to multimedia files. For illustrative purposes, three items are shown: Items 231, 232, and 233. The playlist 125 may be organized according to a format that contains a number of fields. The format of the items may include an access parameter 210 and a play parameter 220.

The access parameter 210 includes a file path 212, a location type 214, a name 216, and a content type 218. The access parameter 210 may include more or less than the above. The file path 212 may specify the path to a remote site such as a network site or a local site such as a file in a local directory. The file path 212 may specify a uniform resource locator (URL) such as an address of a Web page on the World Wide Web. It may also specify an Internet Protocol (IP) address. For example, the filepath1 of the item 231 specifies "http://192.168.0.101/sunset.jpg" which is an image file located at the IP address 192.168.0.101. The filepath2 of the item 232 specifies "http://www.youtube.com/watch?v=H3vLZqPZxZE" which is a Web page of YouTube that point to a video clip titled Yoga. The filepath3 of the item 233 specifies "C:\Sample Music\Audio.mp3" which is an Audio.mp3 located at the directory CAS ample Music.

The location type 214 specifies the location of the corresponding multimedia file. It may be on a network or a local location. For example, the location types of the items 231, 232, and 233 are digital living network alliance (DLNA), Internet, and local, respectively. The name 216 specifies the name of the multimedia file. For example, the names of the items 231, 232, and 233 are Sunset, Yoga, and Jackson, respectively. The content type 218 specifies the type of the content of the multimedia file. For example, the content types of the items 231, 232, and 233 are image, video, and audio, respectively.

The play parameter 220 may specify a parameter or parameters for playing the corresponding multimedia file. It may include a frequency 222, a date 224, and a time 226. More or less parameters may be used. The frequency 222 indicates how often the multimedia file may be played or rendered. For example, the frequencies of the items 231, 232, and 233 are daily, every Monday, and once, respectively. The date 224 specifies the date that the multimedia file may be played. The date 224 may be optional and may not be needed. For example, the dates of the items 231, 232, and 233 are not available (N/A), N/A, and Sep. 7, 2010, respectively. The time 226 specifies the time that the multimedia file may be played. For example, the times of the items 231, 232, and 233 are 6:00 PM. 7:00 AM, and 3:00 PM, respectively.

The play parameter 220 may be extracted by the compiler 140 and passed to the scheduler 150 so that the scheduler 150 may schedule the playlist to be played accordingly.

FIG. 3 is a flowchart illustrating a process 300 for centralized multimedia access according to one embodiment.

Upon START, the process 300 creates a playlist in a single document (Block 310). The single document may be stored in a file. The playlist may include a plurality of items. Each of the items may specify an access parameter to a multimedia file and a play parameter. This may include editing an item on the playlist specifying the access parameter and the play parameter for the multimedia file. The access parameter may include at least a file path, a location type, a name, and a content type. Next, the process 300 stores the playlist in a central location (Block 320). The central location may be on a network location or a local location.

Then, the process 300 retrieves or accesses the multimedia file as pointed to by the playlist in the central location as provided by the user using the access parameter in the playlist to play the multimedia file according to the play parameter (Block 330). The process 300 is then terminated.

FIG. 4 is a flowchart illustrating the process 330 shown in FIG. 3 to access the playlist of multimedia files according to one embodiment.

Upon START, the process 330 compiles the playlist to determine the access parameter, the play parameter, and a plug-in associated with the multimedia file (Block 410). This may include parsing an item of the playlist to extract the file path and the play parameter. Next, the process 330 schedules the playlist according to the play parameter (Block 420). Then, the process 300 accesses the multimedia file via the file path in the access parameter (Block 430).

Next, the process 330 invokes the plug-in to play the multimedia file according to the play parameter (Block 440). The process 330 is then terminated.

Figure 5:
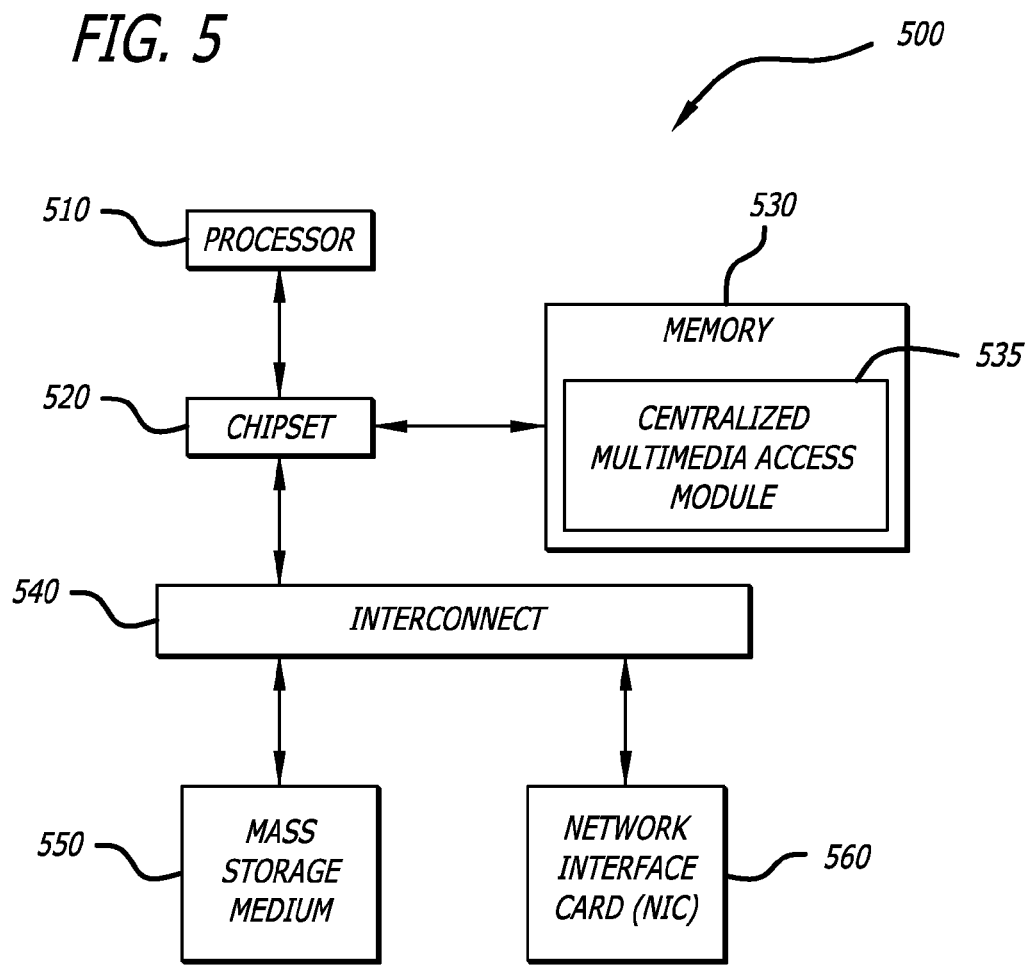
FIG. 5 is a diagram illustrating a processing system to perform centralized multimedia access according to one embodiment.

FIG. 5 is a diagram illustrating a processing system 500 to perform centralized multimedia access according to one embodiment. The processing system 500 may be a part of a computer system or a mobile device. It may include a processor 510, a chipset 520, a memory 530, an interconnect 540, a mass storage medium 550, a network interface card 560. The processing system 500 may include more or less than the above components.

The processor 510 may be a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The chipset 520 provides control and configuration of memory and input/output (I/O) devices such as the memory 530, the mass storage medium 550, and the network interface card 560. The chipset 520 may integrate multiple functionalities such as I/O controls, graphics, media, host-to-peripheral bus interface, memory control, power management, etc.

The memory 530 stores system code and data. The memory 530 is typically implemented with dynamic random access memory (DRAM), static random access memory (SRAM), or any other types of memories including those that do not need to be refreshed, including read only memory (ROM), flash memories. In one embodiment, the memory 530 may contain a centralized multimedia access module 535. It is contemplated that the centralized multimedia access module 535, or any of its components, may be implemented by hardware, software, firmware, or any combination thereof.

The interconnect 540 provides an interface for the chipset 520 to communicate with peripheral devices such as the mass storage medium 550 and the NIC 560. The interconnect 540 may be point-to-point or connected to multiple devices. For clarity, not all the interconnects are shown. It is contemplated that the interconnect 540 may include any interconnect or bus such as Peripheral Component Interconnect (PCI), PCI Express, Universal Serial Bus (USB), and Direct Media Interface (DMI), etc. The mass storage medium 550 may include compact disk (CD) read-only memory (ROM), memory stick, memory card, smart card, digital video/versatile disc (DVD), floppy drive, hard drive, tape drive, and any other electronic, magnetic or optic storage devices. The mass storage device provides a mechanism to read machine-accessible media. The NIC 560 provides interface to a network such as the Internet or a local area network.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store or transfer information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical storage medium, a magnetic storage medium, a memory stick, a memory card, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method comprising:
creating a playlist in a single document, the playlist including a plurality of items, each of the items specifying an access parameter to a multimedia file and a play parameter, wherein the play parameter includes at least one of a frequency, a date, and a time, wherein creating the playlist includes:
editing an item on the playlist specifying the access parameter and the play parameter for the multimedia file, the access parameter including at least a file path, a location type, a name, and a content type;
storing the playlist in a central location; and
retrieving or accessing the multimedia file as pointed to by the playlist in the central location using the access parameter in the playlist to play the multimedia file according to the play parameter, wherein retrieving or accessing the multimedia file includes:
compiling the playlist to determine the access parameter, the play parameter, and a plug-in associated with the multimedia file;
scheduling the playlist according to the play parameter;
accessing the multimedia file via the file path in the access parameter; and
invoking the plug-in to play the multimedia file according to the schedule.

2. The method of claim 1 wherein the location type is one of a network location, a local location, and a digital living network alliance (DLNA) location.

3. The method of claim 1 wherein storing the playlist comprises:
storing the playlist in the central location on a network location or a local location.

4. The method of claim 3 wherein the local location is one of a storage device on a mobile device, a hard disk, a digital versatile disk (DVD), and a universal serial bus (USB) device.

5. The method of claim 1 wherein the multimedia file is one of a video clip, an audio clip, and an image file.

6. The method of claim 1 wherein the plurality of items corresponds to a plurality of multimedia files having a mix of different types and formats.

7. The method of claim 6 wherein the formats include at least one of Moving Picture Experts Group (MPEG), QuickTime, Audio Video Interleave (AVI), Windows Media Video (WMV), Flash Video, Windows Media Audio (WMA), Real Audio (RA), Joint Photographic Experts Group (JPEG), Tagged Image File Format (TIFF), Graphics Interchange Form a (GIF), Portable Network Graphics (PNG), Bitmap (BMP), Computer Graphics Metafile (CGM), Scalable Vector Graphics (SVG), JPEG stereo, Multi-Picture Object (MPO).

8. An article of manufacture comprising:
a machine-accessible storage medium including data that, when accessed by a machine, cause the machine to perform operations comprising:
creating a playlist in a single document, the playlist including a plurality of items, each of the items specifying an access parameter to a multimedia file and a play parameter, wherein the play parameter includes at least one of a frequency, a date, and a time, wherein creating the playlist includes:
editing an item on the playlist specifying the access parameter and the play parameter for the multimedia file, the access parameter including at least a file path, a location type, a name, and a content type;
storing the playlist in a central location; and
retrieving or accessing the multimedia file as pointed to by the playlist in the central location using the access parameter to play the multimedia file according to the play parameter, wherein retrieving or accessing the multimedia file includes:
compiling the playlist to determine the access parameter, the play parameter, and a plug-in associated with the multimedia file;
scheduling the playlist according to the play parameter;
accessing the multimedia file via the file path in the access parameter; and
invoking the plug-in to play the multimedia file according to the schedule.

9. The article of manufacture of claim 8 wherein the location type is one of a network location, a local location, and a digital living network alliance (DLNA) location.

10. The article of manufacture of claim 8 wherein the data causing the machine to perform storing the playlist comprise data that, when accessed by the machine, cause the machine to perform operations comprising:
storing the playlist in the central location on a network location or a local location.

11. The article of manufacture of claim 10 wherein the local location is one of a storage device on a mobile device, a hard disk, a digital versatile disk (DVD), and a universal serial bus (USB) device.

12. The article of manufacture of claim 8 wherein the multimedia file is one of a video clip, an audio clip, and an image file.

13. The article of manufacture of claim 8 wherein the plurality of items corresponds to a plurality of multimedia files having a mix of different types and formats.

14. The article of manufacture of claim 13 wherein the formats include at least one of Moving Picture Experts Group (MPEG), QuickTime, Audio Video Interleave (AVI), Windows Media Video (WMV), Flash Video, Windows Media Audio (WMA), Real Audio (RA), Joint Photographic Experts Group (JPEG), Tagged Image File Format (TIFF), Graphics Interchange Form a (GIF), Portable Network Graphics (PNG), Bitmap (BMP), Computer Graphics Metafile (CGM), Scalable Vector Graphics (SVG), JPEG stereo, Multi-Picture Object (MPO).

15. An apparatus comprising:
a storage element containing a pointer to point to a playlist in a single document, the playlist including a plurality of items, each of the items specifying an access parameter to a multimedia file and a play parameter, wherein the play parameter includes at least one of a frequency, a date, and a time;
a compiler coupled to the storage element to compile the playlist to determine the access parameter, the play parameter, and a plug-in associated with the multimedia file;
a scheduler coupled to the compiler to generate a schedule for the playlist according to the play parameter;
wherein the plug-in plays the multimedia file according to the schedule.

16. The apparatus of claim 15 wherein the access parameter includes at least a file path, a location type, a name, and a content type.

17. The apparatus of claim 16 wherein the location type is one of an Internet location, a local location, a digital living network alliance (DLNA) location.

18. The apparatus of claim 15 wherein the playlist is stored in a central location on a network location or a local location.

19. The apparatus of claim 18 wherein the local location is one of a storage device on a mobile device, a hard disk, a digital versatile disk (DVD), and a universal serial bus (USB) device.

20. The apparatus of claim 15 wherein the multimedia file is one of a video clip, an audio clip, and an image file.

21. The apparatus of claim 15 wherein the plurality of items corresponds to a plurality of multimedia files having a mix of different types and formats.

22. The apparatus of claim 21 wherein the formats include at least one of Moving Picture Experts Group (MPEG), QuickTime, Audio Video Interleave (AVI), Windows Media Video (WMV), Flash Video, Windows Media Audio (WMA), Real Audio (RA), Joint Photographic Experts Group (JPEG), Tagged Image File Format (TIFF), Graphics Interchange Form a (GIF), Portable Network Graphics (PNG), Bitmap (BMP), Computer Graphics Metafile (CGM), Scalable Vector Graphics (SVG), JPEG stereo, Multi-Picture Object (MPO).

\* \* \* \* \*